US011075557B2

(12) United States Patent
Herrada et al.

(10) Patent No.: US 11,075,557 B2
(45) Date of Patent: Jul. 27, 2021

(54) ROTOR OF ROTATING ELECTRICAL MACHINE AND ASSOCIATED FABRICATION PROCESS

(71) Applicant: Valeo Systèmes d'Essuyage, Le Mesnil Saint Denis (FR)

(72) Inventors: Jose-Luis Herrada, Le Mesnil Saint Denis (FR); Quentin Aubugeau, Chatellerault (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 180 days.

(21) Appl. No.: 16/229,978

(22) Filed: Dec. 21, 2018

(65) Prior Publication Data

US 2019/0207455 A1 Jul. 4, 2019

(30) Foreign Application Priority Data

Jan. 2, 2018 (FR) ...................................... 1850002

(51) Int. Cl.
*H02K 3/16* (2006.01)
*H02K 3/28* (2006.01)
(Continued)

(52) U.S. Cl.
CPC ................. *H02K 3/16* (2013.01); *H02K 1/26* (2013.01); *H02K 3/28* (2013.01); *H02K 3/51* (2013.01);
(Continued)

(58) Field of Classification Search
CPC .. H02K 3/16; H02K 3/28; H02K 3/51; H02K 23/30; H02K 1/26; H02K 15/024; H02K 15/09; H02K 1/265; H02K 1/14
(Continued)

(56) References Cited

U.S. PATENT DOCUMENTS

| 5,661,355 A * | 8/1997 | Darceot | H02K 3/28 |
| | | | 310/180 |
| 2006/0220489 A1* | 10/2006 | Osawa | H02K 23/28 |
| | | | 310/198 |

(Continued)

FOREIGN PATENT DOCUMENTS

| CN | 105391215 A | 3/2016 |
| DE | 102014217289 A1 | 3/2016 |

(Continued)

OTHER PUBLICATIONS

Machine Translation, Takahashi, JP-10285854-A, Oct. 1998. (Year: 1998).*

(Continued)

*Primary Examiner* — Thomas Truong
(74) *Attorney, Agent, or Firm* — Osha Bergman Watanabe & Burton LLP

(57) ABSTRACT

The present invention relates to a rotor (1) of a rotary electric machine, comprising:
- a body (3) comprising a cylindrical central core (5) and a circumferential plurality of arms (B1 . . . B18) extending radially out from the cylindrical central core (5), the body (3) being intended to be mounted with the ability to move about an axis of rotation X,
- a coilset produced by windings of turns and forming at least one series of coils (C1 . . . C9, C1' . . . C9'), a coil (C1 . . . C9, C1' . . . C9') comprising a predetermined number of turns around at least two arms (B1 . . . B18) of the body (3), two adjacent coils (C1 . . . C9, C1' . . . C9') of a series being angularly offset from one another with a partial overlap, in which the last coil (C9, C9'), situated radially furthest towards the outside, comprises a predetermined number of (Continued)

turns that is lower than the predetermined number of turns of the other coils of the series (C1 ... C8, C1' ... C8').

6 Claims, 6 Drawing Sheets

(51) Int. Cl.
  *H02K 3/51* (2006.01)
  *H02K 23/30* (2006.01)
  *H02K 1/26* (2006.01)
  *H02K 15/02* (2006.01)
  *H02K 15/09* (2006.01)
(52) U.S. Cl.
  CPC .......... *H02K 15/024* (2013.01); *H02K 15/09* (2013.01); *H02K 23/30* (2013.01)
(58) Field of Classification Search
  USPC ................................................. 310/179, 195
  See application file for complete search history.

(56) References Cited

U.S. PATENT DOCUMENTS

2014/0368078 A1  12/2014  Odani et al.
2016/0065022 A1*  3/2016  Huber ..................... H02K 3/50
                                                  310/214

FOREIGN PATENT DOCUMENTS

JP       10285854 A  * 10/1998
JP       H10 285854 A   10/1998
JP       2017 028799 A   2/2017

OTHER PUBLICATIONS

First Office Action in corresponding Chinese Application No. 2019100010398, dated Jul. 2, 2020 (11 pages).
Preliminary Search Report in corresponding French Application No. 1850002, dated Jul. 31, 2018 (2 pages).

* cited by examiner

ROTOR OF ROTATING ELECTRICAL MACHINE AND ASSOCIATED FABRICATION PROCESS

The present invention relates to a rotary machine, notably to an electric motor, intended to be used in a motor vehicle, for example in a geared motor unit, and more particularly to a rotary machine comprising a wound rotor.

It is known practice to use wound rotors in certain electric motors. These wound rotors generally comprise a body, made of a stack of laminations, comprising arms around which turns are wound to form coils intended to interact with the poles of the stator made using magnets or alternatively using coils. The application of power to the coils of the rotor allows interaction with the poles of the stator so as to turn the rotor. The application of power to the coils of the rotor is achieved for example using a slip-ring, powered by brushes.

The various coils of the rotor are angularly offset from one another and may notably be superposed. In that case, the turns of the last coil or coils are wound and held around the end of the arms in such a way that there is a not-insignificant risk of a turn slipping off during the life of the rotary machine, potentially leading to a malfunctioning of the latter. Specifically, the diameter of the rotor needs to be limited as far as possible so as to limit the size of the rotary machine, which makes it easier to use in the vehicle, and explains why the size of the arms cannot be increased in order to prevent the turns slipping off.

The present invention therefore seeks to provide a solution that makes it possible to prevent the last turns of a coilset of a rotor from slipping off, without increasing the diameter of the rotor.

To this end, the present invention relates to a rotor of a rotary electric machine, comprising:
- a body comprising a cylindrical central core and a circumferential plurality of arms extending radially out from the cylindrical central core, the body being intended to be mounted with the ability to move about an axis of rotation X,
- a coilset produced by successive windings of turns and forming at least one series of coils, a coil comprising a predetermined number of turns around at least two arms of the body, two adjacent coils of a series being angularly offset from one another with a partial overlap, in which the last coil of the series, situated radially furthest towards the outside, comprises a predetermined number of turns that is lower than the predetermined number of turns of the other coils of the series.

The rotor may also have one of the following additional aspects:

at least one series of coils comprises at least one additional turn wound between several arms of which at least one is different from the arms around which the last coil of the series is wound.

The number of arms covered by the additional turn may be different than the number of arms covered by the other coils.

The at least one additional turn is wound around at least one of the arms around which the last coil of the series is wound.

The use of at least one arm different from the arms around which the last coil of the series is wound and of at least one arm around which the last coil of the series is wound allows the additional turn to partially overlap the turns of the last coil of the series so as to hold them in position.

The at least one additional turn extends in such a way as to at least partially overlap the penultimate coil of the series adjacent to the last coil of the series.

The partial overlapping of the penultimate coil of the series means that the additional turn extends in an opposite direction to the coils of the series.

The at least one additional turn extends in a direction substantially equal to 360° divided by the number of poles of the rotary electric machine with respect to the direction of the turns of the last coil of the series. For a machine comprising four poles, that corresponds to an additional turn extending in a direction substantially perpendicular to the direction of the turns of the last coil of the series.

The at least one additional turn partially overlaps the turns of the last coil of the series.

The rotor may comprise two series of coils arranged at 180° with respect to one another with respect to the axis of rotation X.

The rotor may also comprise a higher number of series of coils, for example four coils arranged at 90°.

The arms of the body have the overall shape of a T of which the base is directed towards the axis of rotation X and of which the free end forms two salient turn-retention returns, the predetermined number of turns of the last coil of the at least one series being determined such that the turns of the said last coil are at least partially comprised in a space defined by the straight lines passing through the end of the salient returns allowing retention of the turns of the said last coil and perpendicular to the straight line connecting the ends of the said salient returns allowing retention of the turns of the last coil.

The rotor is configured to collaborate with a stator of the rotary electric machine comprising a number of poles greater than or equal to four.

The angle covered by the arms around which a coil is formed is substantially equal to 360° divided by the number of poles of the rotary electric machine. That allows a coil to cover one pole pitch.

The rotor comprises at least ten arms.

The rotor comprises eighteen arms, a coil being formed by turns wound around four arms.

The number of turns of the coils that come before the last coil is 30 turns.

The number of coils of the rotor may be nine or eighteen distributed between two series of nine coils.

The number of poles is equal to 4.

The present invention also relates to a rotary machine comprising a rotor as described hereinabove.

The present invention also relates to a method of manufacturing a rotor of a rotary electric machine comprising a body comprising a cylindrical central core and a circumferential plurality of arms extending radially out from the cylindrical central core, the body being intended to be mounted with the ability to move about an axis of rotation X, the method comprising:
- a succession of steps of winding a first predetermined number N of turns of a coilset around at least two arms of the body to form at least one series of coils, the winding steps being performed in such a way that two adjacent coils of a series are wound around at least one common arm and at least one distinct arm, two adjacent coils of a series being angularly offset from one another with a partial overlap,
- an additional step of winding a second predetermined number N' of turns, lower than the first predetermined number N, around at least two arms of the body to form a last coil of the series, situated radially furthest towards the outside, the additional step being performed around at least one arm common to the penultimate coil of the series, adjacent to the last coil of the series, and at least one arm distinct from the penultimate coil of the series, such that the last coil of the series is angularly offset from the penultimate coil of the series, with a partial overlap.

The method of manufacture may also have one of the following aspects:

The method of manufacture comprises another additional step of winding at least one turn of the coilset around at least two arms of which at least one is different from the arms around which the last coil of the series is wound.

The various steps are performed in duplicate and simultaneously at a first place on the body and at a second place on the body that is diametrically opposite the first place so as to form, simultaneously, two series of coils which are symmetric about the axis of rotation X.

Alternatively, the steps are performed in duplicate and alternately at a first place on the body and at a second place on the body that is diametrically opposite the first place so as to form two series of coils which are symmetric about the axis of rotation X.

Further features and advantages of the invention will become more clearly apparent from reading the following description, given by way of example and in no way limiting, in reference to the appended drawings, in which.

Figure 3:
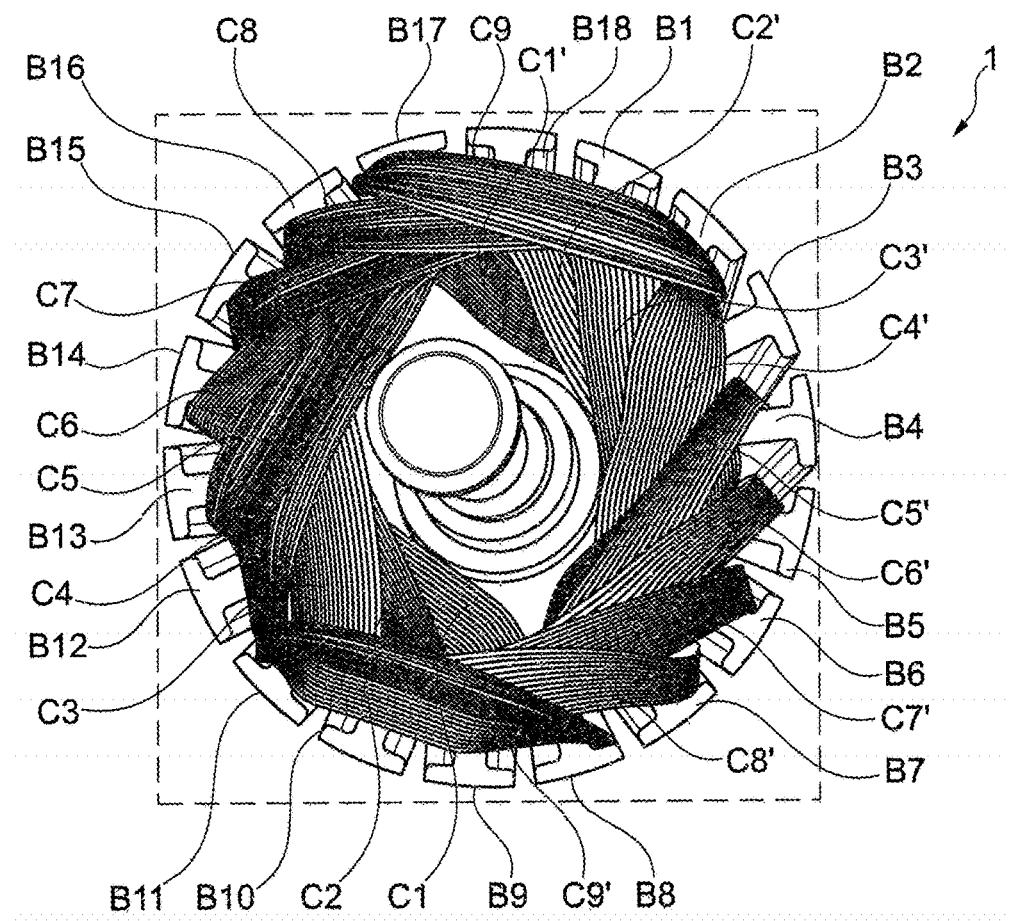
Figure 6:
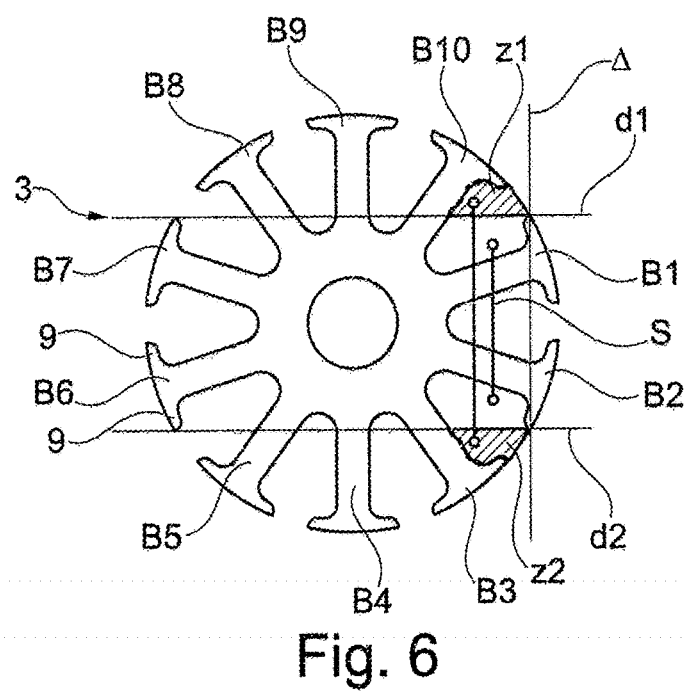
Figure 4:
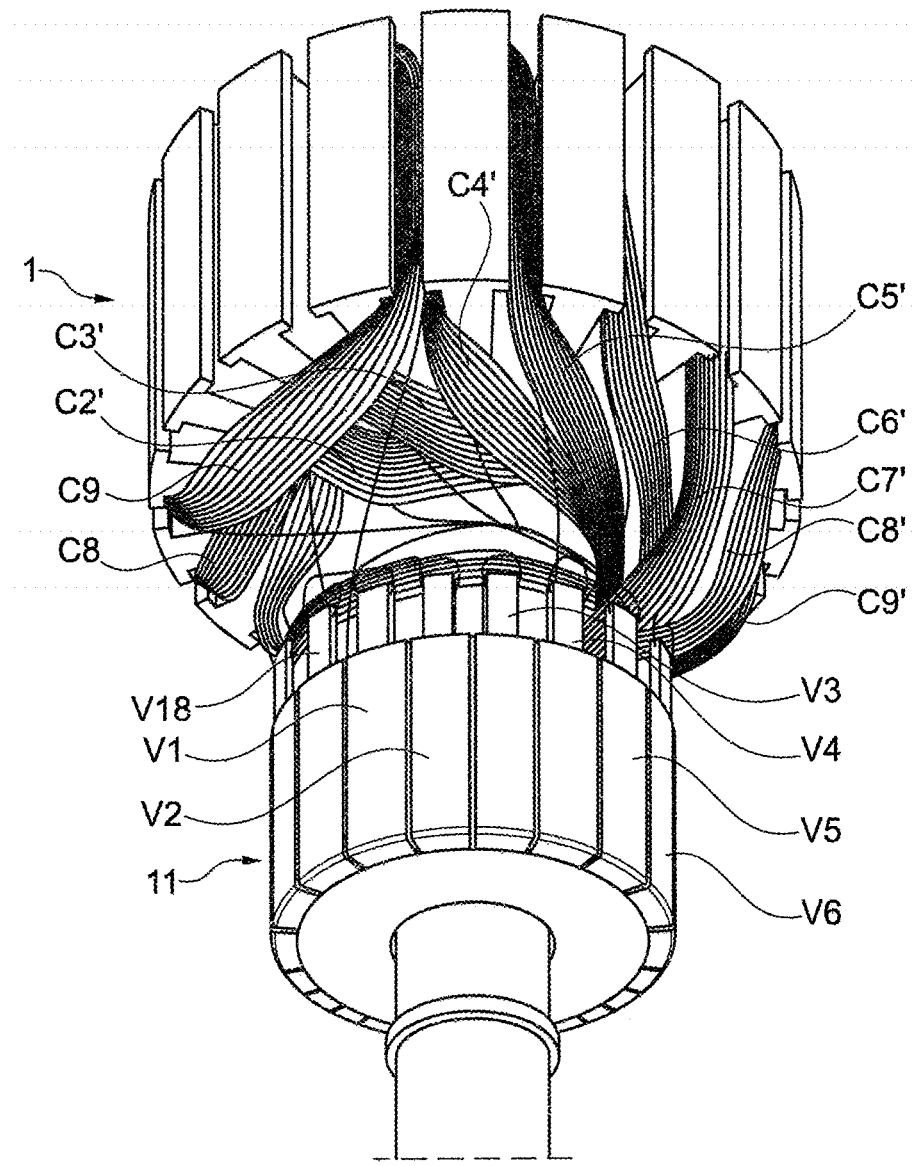
Figure 5:
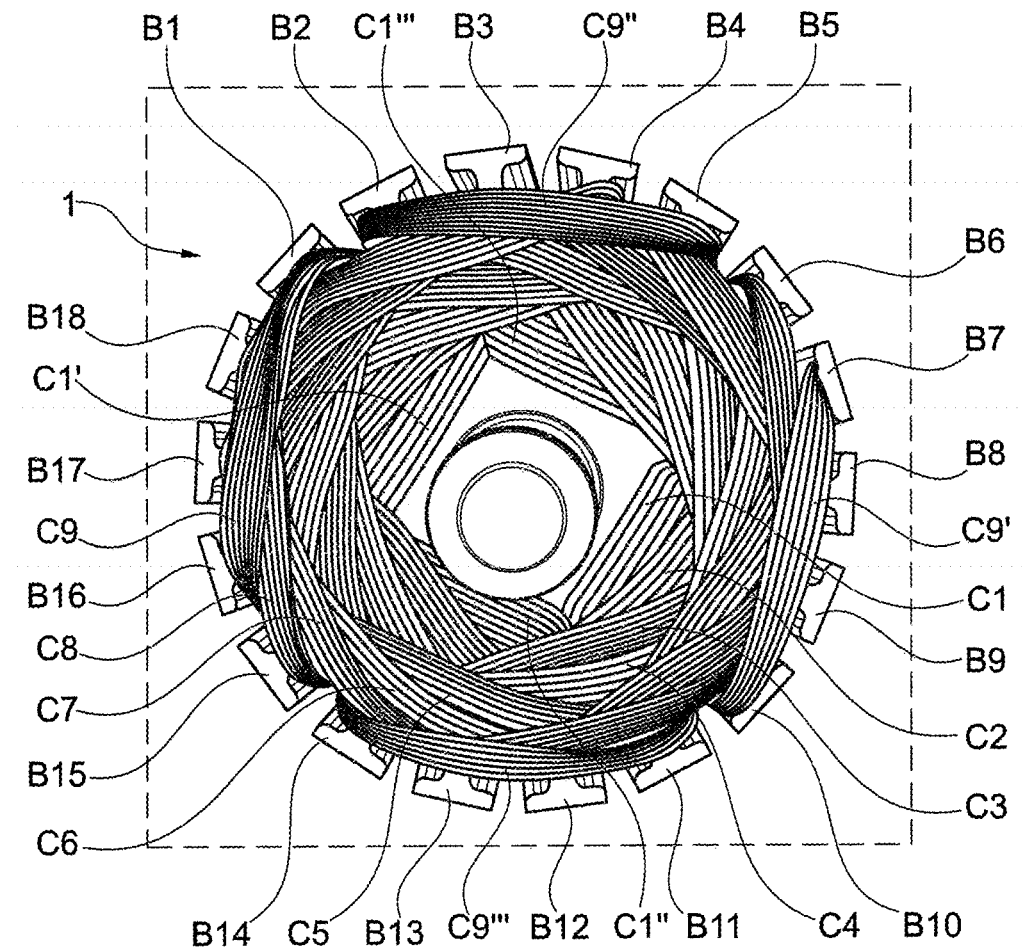
Figure 7:
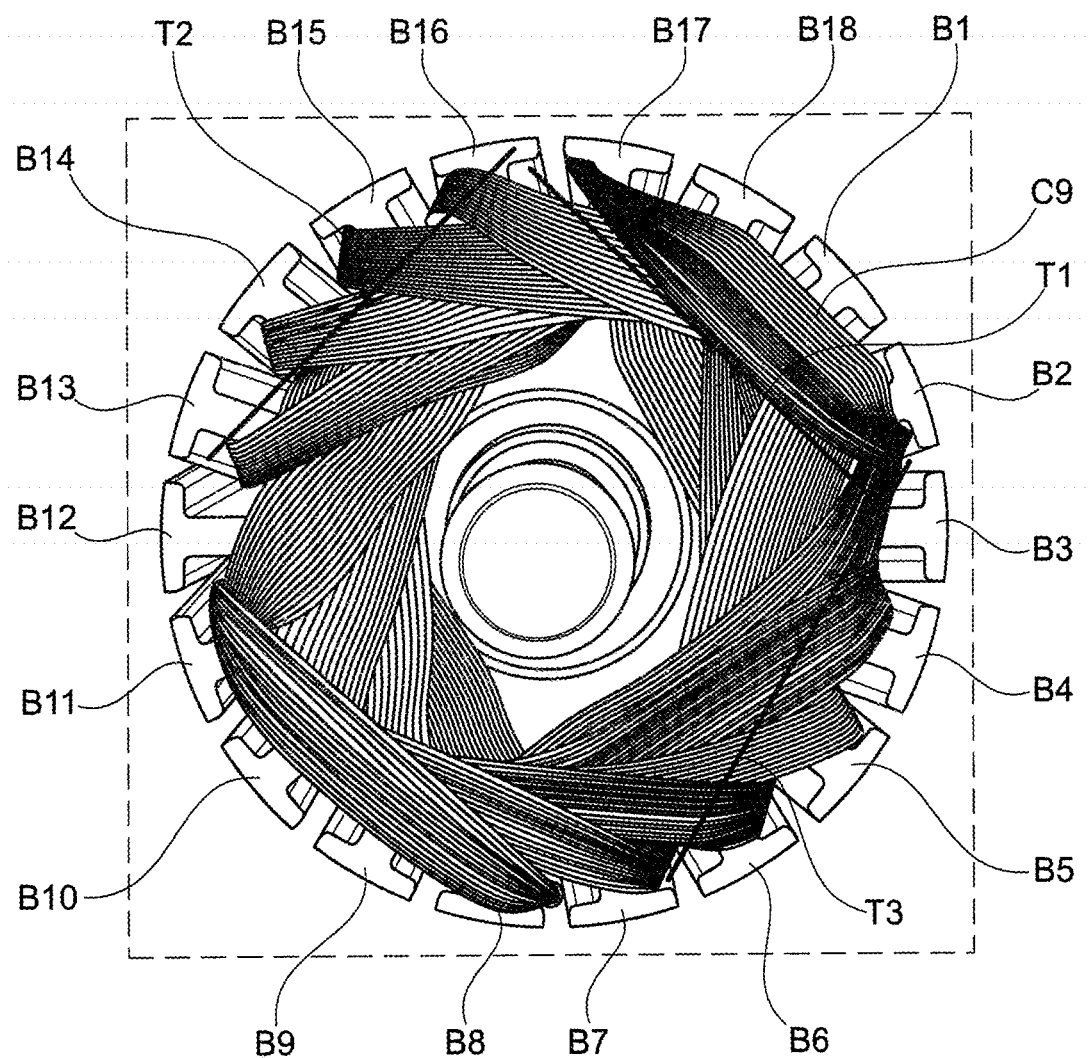
Figure 8:
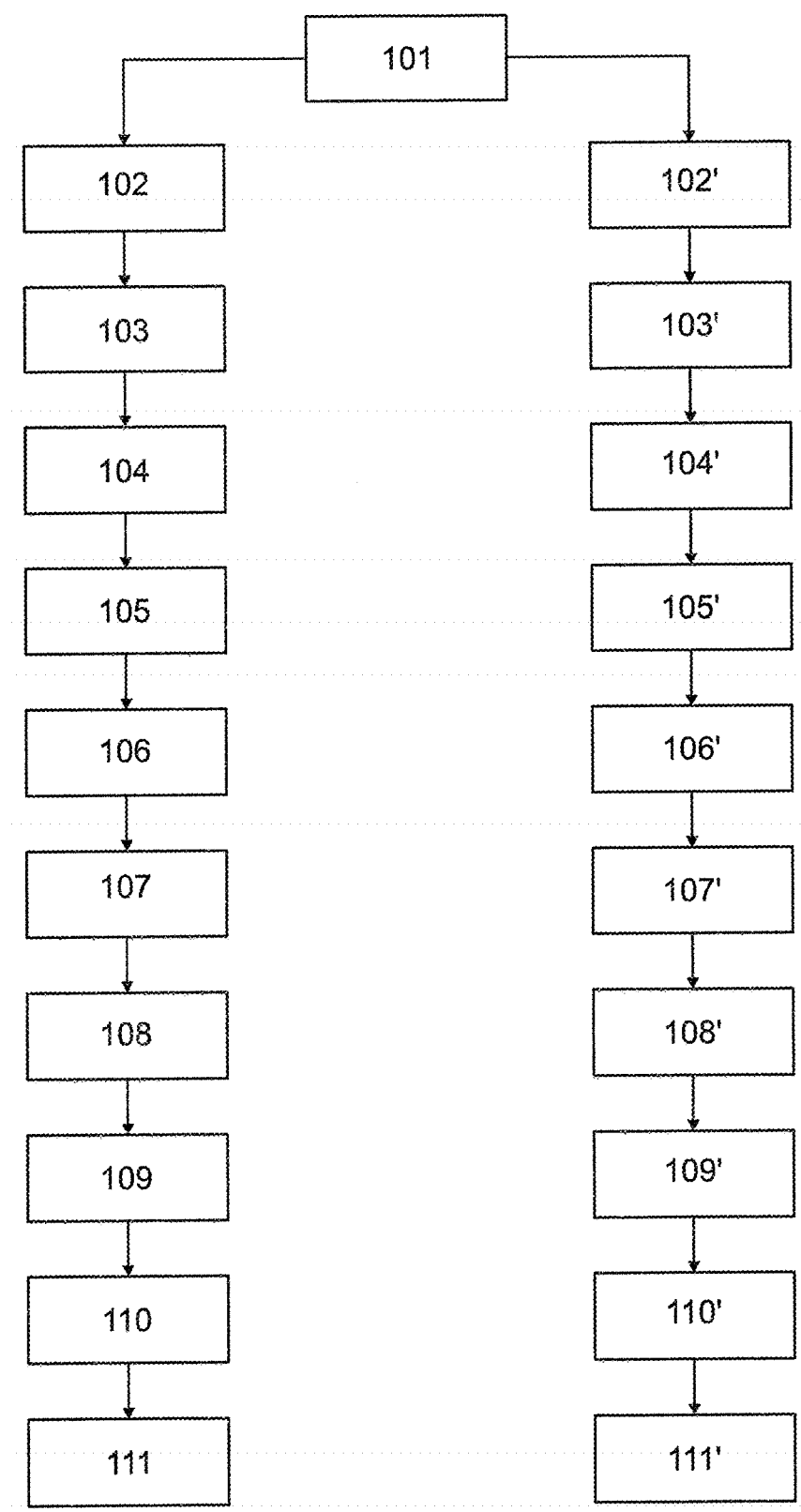

FIG. 3 is a diagram of a rotor comprising two series of coils each comprising nine coils which are angularly offset from one another, FIG. 4 is a diagram of the rotor of FIG. 3, viewed from the slip-ring side, FIG. 5 is a diagram of a rotor comprising four series of coils, FIG. 6 is a schematic view on the axis of rotation X of a rotor body, and of a position of the winding turns, FIG. 7 is a diagram of the rotor of FIG. 3, showing two possible locations for the additional turns, FIG. 8 is a flowchart of the various steps in the manufacture of a rotor according to the present invention.

In all the figures, elements that are identical bear the same reference numbers.

The following embodiments are examples. Although the description refers to one or more embodiments, this does not necessarily mean that each reference relates to the same embodiment, or that the features apply only to just one embodiment. Single features of various embodiments can also be combined or interchanged in order to create other embodiments.

Figure 1:
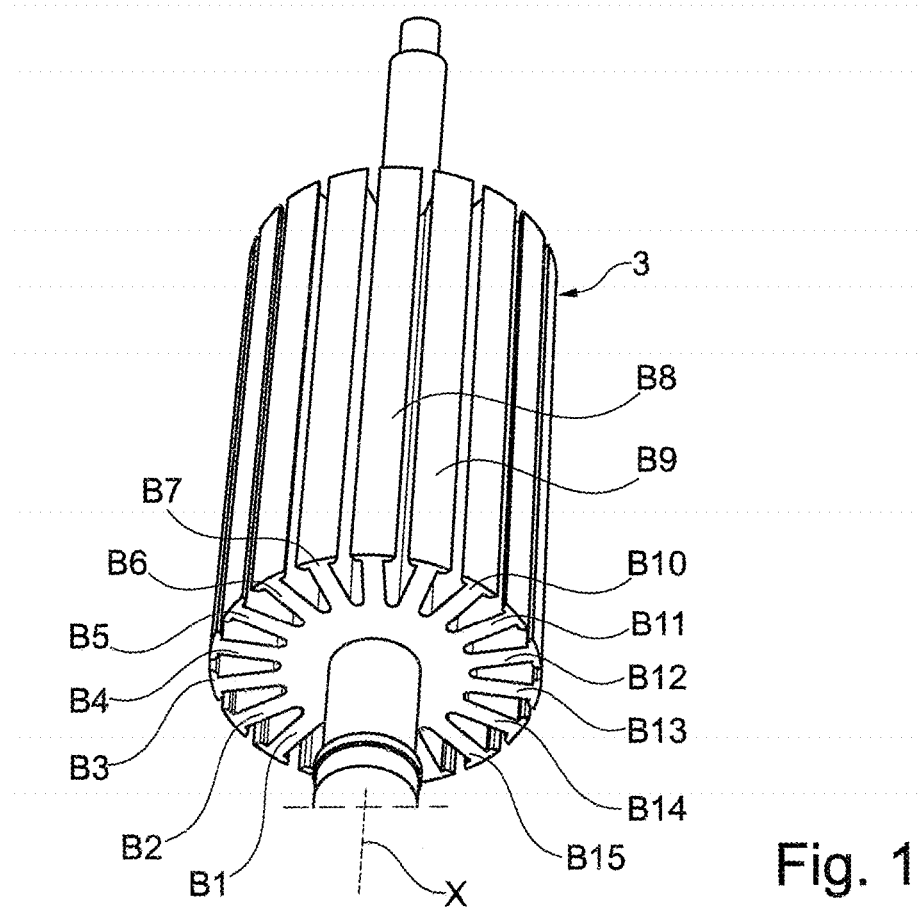
FIG. 1 is a schematic perspective view of a rotor body.

FIG. 1 is a schematic perspective view of a body 3 of a rotor 1 of a rotary machine such as an electric motor. In the context of the present invention, the rotary machine comprises at least four poles arranged at the stator (not depicted). The poles of the stator are for example produced using permanent magnets.

The body 3 of the rotor 1 has a cylindrical overall shape and is intended to accept a coilset forming a plurality of coils distributed around its periphery. The body 3 is intended to be mounted with the ability to move about an axis of rotation X corresponding to the central axis of the cylinder.

The body 3 comprises a cylindrical central core 5 and a circumferential plurality of arms, eighteen of these in this instance, denoted B1, B2 . . . B18 (arms B16, B17 and B18 being hidden in FIG. 1), which means to say a plurality of arms are arranged on the circumference of the cylindrical central core 5, extending radially out from the cylindrical central core 5. The arms B1 . . . B18 are evenly distributed around the entire circumference of the cylindrical central core 5 and are separated by notches intended to accept windings of turns of a coilset. In this instance, the body comprises 18 arms, but the invention is not restricted to this number of arms but to any number, preferably higher than 10. In addition, the arms may be distributed non-uniformly.

Figure 2:
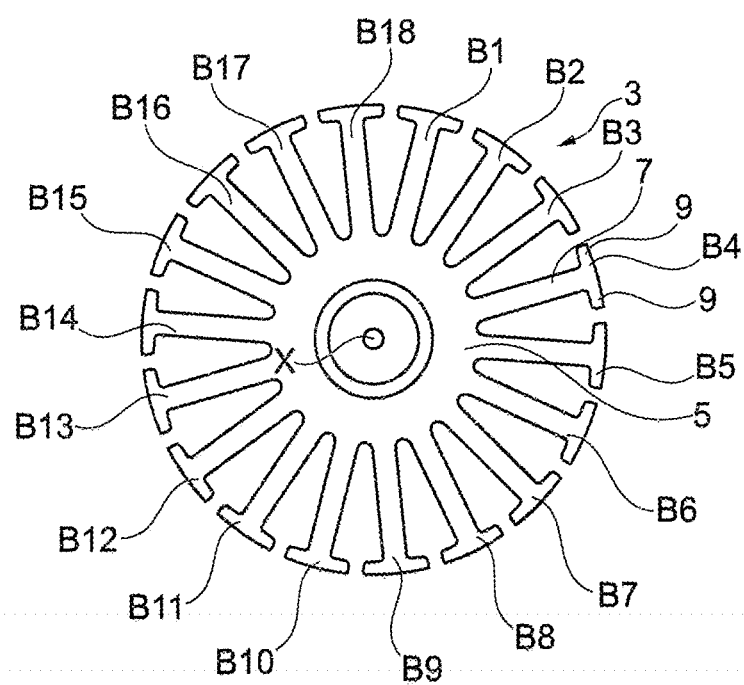
FIG. 2 is a schematic view in radial section of a rotor body.

As is best visible in FIG. 2 which depicts a view in radial section of the body 3, the arms B1 . . . B18 of the body 3 have for example the overall shape of a T of which the base 7 is directed towards the axis of rotation X and of which the free end forms two salient returns 9 which assist with turn retention.

The body 3 is formed for example of a bundle of laminations assembled with one another, each lamination corresponding to one "slice" of the body 3 comprising a cylindrical central core 5 and a plurality of arms B1 . . . B18. However, other types of body 3, for example one-piece bodies, are equally possible.

FIG. 3 depicts a diagram of a rotor 1 comprising a coilset which comprises windings of turns forming two series of coils C1 . . . C9 and C1' . . . C9' distributed on the arms B1 . . . B9 of the body 3. A coil is produced by a plurality of turns wound around at least two arms B1 . . . B18 of the body and produced from a single wire. The wire is, for example, a copper wire. The rotor 1 also comprises a slip-ring 11 allowing the coils to be supplied with power as depicted in FIG. 4. FIG. 4 depicts the rotor 1 of FIG. 3 seen from the side of the slip-ring 11, the two ends of a coil C1 . . . C9' are respectively connected to a predefined terminal of a slip-ring 11 so as to allow the coil to be supplied with power at the desired moment so as to turn the rotor 1. The slip-ring comprises, for example, eighteen terminals denoted V1 . . . V18 against which brushes (not depicted) rub in order to apply power to the coils C1 . . . C9'.

However, it should be noted that the present invention is not restricted to a rotor 1 comprising two series of coils C1 . . . C9' but extends to rotors 1 comprising a different number of series of coils, for example four series of coils arranged 90° apart, as depicted in FIG. 5. For the sake of clarity, some of the coils in FIG. 5 have not been referenced. The coils C1' . . . C9' of the second series are situated facing the coils of the first series C1 . . . C9 as in the embodiment of FIG. 3, but the rotor 1 also comprises a fourth series C1'' . . . C9''' situated facing the third series C1'' . . . C9'', the various series being positioned 90° apart. The series of coils may be produced simultaneously if the machine performing the winding steps comprises several winding arms, thereby making it possible to form the coilset of the rotor 1 more rapidly.

The series may also be produced in alternation if the machine has just one turn winding arm. In the latter instance, the first coils C1, C1', C1'', C1''' of each of the series are wound, followed by the second coils C2, C2', C2'', C2''' of each of the series, and so on, up to the last coils C9, C9', C9'', C9''', of each series. It is therefore possible to have two series of coils C1 . . . C9, C1' . . . C9' which can be produced using a single winding arm of the machine performing the winding. The number of series of coils is notably dependent on the number of poles. In general, the number of series of coils is equal to one or to the number of poles or to half the number of poles. Hence, for a motor comprising four poles, the number of series of coils is one, two or four.

The use of a rotor 1 comprising two diametrically opposed series of coils makes it possible to obtain a rotor 1 that is better balanced (as compared with a rotor 1 comprising a single series of coils) because the positions of the coils of the two series are symmetrical about the axis of rotation X of the rotor 1 and do not therefore create any additional imbalance.

In the scenario of FIG. 3, the two series of coils are substantially identical and are positioned 180° apart, which means to say that one coil, for example the first coil C1 of the first series is situated opposite the same coil, in our example the first coil C1', of the other series of coils. In this instance, each of the series comprises nine coils respectively denoted C1, C2 . . . C9, and C1', C2' . . . C9'. However, it is equally possible to have a different number of coils in each series. For preference, the two series of coils have the same number of coils in order to obtain a rotor 1 that is balanced.

A coil is therefore formed by a winding of a predetermined number of turns, for example thirty turns, around at least two arms of the body 3. The turns of a coil are all wound in the same direction of rotation (clockwise or anticlockwise). In addition, all of the turns of the various coils of a series C1 . . . C9' are also wound in the same direction of rotation. In the scenario of FIG. 3, a coil C1 . . . C9' is formed by a winding of turns around four arms, namely four arms of the body are arranged in the middle of the turns of a coil C1 . . . C9', the windings being performed in the notches adjacent to those two of the four arms that are most distantly spaced. Thus, the turns that form the coil C1 are wound around the arms B9, B10, B11 and B12, whereas the turns of the next coil C2 of the series are wound around the arms B10, B11, B12 and B13 (an offset by one arm or 20° between two successive coils). Thus, two successive coils are angularly offset with respect to one another with a partial overlap. In this instance, the offset between two successive coils corresponds to an offset by one arm, which corresponds to 20°. Because of the partial overlap, combined with the presence of two series of coils arranged at 180° with respect to one another in this instance, the turns are positioned increasingly close to the periphery of the rotor 1 and to the salient returns 9 of the arms B1 . . . B18. The number of arms B1 . . . B18 around which a coil is wound is chosen to be substantially equal to the pole pitch, or slightly smaller. The pole pitch corresponds to an angle equal to 360° divided by the number of poles of the stator. In this case, the stator comprises four poles so the pole pitch is equal to 90°. Because the rotor 3 comprises eighteen arms, in order to obtain a coil that covers an angle of substantially 90°, it is necessary to choose a number of arms equal to four or five on which to wind the turns, and preferably equal to four so as to cover an angle smaller than the pole pitch. However, the coils C1 . . . C9' may equally be wound around a number of arms other than four.

In order to prevent the turns of the last coil, in this instance the coils C9 and C9', corresponding to the coil that is radially outermost in a series from slipping off, the number of turns of the last coil C9, C9' is reduced by comparison with the number of turns of the other coils C1 . . . C8 and C1' . . . C8'. In this instance, the last coil C9, C9' therefore has a number of turns lower than thirty (which is the number of turns of the other coils C1 . . . C8 and C1' . . . C8'). This lower number of turns has a tendency to slightly impair the performance of the rotary machine but does make it possible to avoid the turns of the last coil C9, C9' slipping off and therefore avoid a malfunctioning of the rotary machine. The turns of the coils C1' . . . C8' preceding the last coil C9, C9' are held in position by the turns of the adjacent coil situated radially towards the outside so that there is no problem with turn retention on these coils C1 . . . C8, C1' . . . C8'.

The number of turns on the last coil C9, C9' can be determined in such a way that this number allows the turns to be kept in a predetermined zone of the slots in which the turns of the last coil C9, C9' are positioned. FIG. 6 depicts a schematic view on the axis of rotation X of a body 3 comprising ten arms B1, B2 . . . B10 and intended to receive coils formed by windings of turns around two arms. The last coil of a series is, for example, wound around the arms B1 and B2. The turns of the last coil are therefore positioned in the slots situated, on the one hand, between the arms B2 and B3, and, on the other hand, between the arms B10 and B1. In order to be held by the salient returns 9, the turns of a coil need to be positioned at least partially in a space defined by the straight lines d1 and d2 passing through the end of the salient returns 9 allowing retention of the turns (in this instance the salient returns 9 of the arms B1 and B2) and perpendicular to the straight line Δ connecting the ends of the said salient returns 9 allowing retention of the turns. Thus, the turns of the last coil of a series need to be situated at least partially between the straight lines d1 and d2, such as for example the turn s, and not in the zones z1 and z2 situated on the outside of the straight lines d1 and d2, where the risk of slipping off is great because the turns are no longer retained by the salient returns 9. Thus, the number of turns of the last coil C9, C9' can be determined so that all of the turns of the last coil C9, C9' lie at least partially in the predefined zone between the two straight lines d1 and d2. The risk of the turns of the last coil C9, C9' slipping off is therefore greatly reduced if not to say eliminated.

According to another embodiment of the present invention, at least one additional turn of one series of coils is wound between several arms of which at least one is different from the arms around which the last coil of the series is wound. In addition, the direction of winding of the at least one additional turn may be the same as that of the turns of the coils (clockwise or anticlockwise) of the series, or may be different. In practice, the direction of Winding that increases the motor torque and that is dependent on the offset between the coils in particular is preferably chosen.

However, given that the number of additional turns is low, the direction of winding of the additional turn(s) does not greatly influence the operation of the rotary electric machine. The number of additional turns for example corresponds to the difference between the number of turns of the last coil and the number of turns of the preceding coils. For example, in the example described hereinabove with reference to FIG. 3, the last coil C9, C9' comprises 27 turns (whereas the other coils C1 . . . C8, C1' . . . C8' comprise 30 turns) and three additional turns are wound around the arms at least one of which is different from the arms of the last coil C9, C9' so that the additional turns are retained by the salient returns of the arms around which they are wound. The additional retaining turn or turns are wound in continuity with the last coil of the series so that if the last coil needs to be connected to a first and second predefined terminal of the slip-ring 11, the first end of the last coil is connected to the first terminal and the end of the additional turn or turns is connected to the second terminal.

For preference, in order to limit the influence that the at least one additional turn has on the operation of the rotor 1, this at least one additional turn extends in a direction substantially equal to 360° divided by the number of poles of the motor with respect to the direction of the turns of the last coil C9, C9', namely in a direction substantially perpendicular to the direction of the turns of the last coil C9, C9' for a motor comprising four poles. FIG. 7 is a diagram of a rotor 1 comprising eighteen arms, in which one of the last coils C9 is wound around the arms B18, B17, B1 and B2 as indicated by the line T1 so that in order to obtain additional turns arranged at approximately 90° of this last coil C9, the additional turns may be wound around the arms B13, B14, B15 and B16, as indicated by the line T2 or around the arms B3, B4, B5 and B6 as indicated by the line T3. In the case of the line T2, the additional turns at least partially overlaps the turns of the penultimate coil C8. In addition, the direction of winding (or coiling) of this additional turn T2 will preferably be the opposite to the direction of winding up the last coil C9.

For preference, all of the additional turns are wound around the same arms in order to make these turns easier to wind, but it is equally possible to distribute the additional turns between different locations.

Other locations for the additional turn(s) are also possible. The additional turn(s) may for example be wound around at least one of the arms around which the last coil C9, C9' is wound, and preferably so as to partially overlap the turns of the last coil C9, C9', making it possible to enhance the retention of the turns of the last coil C9, C9'. The additional turns are, for example, set by one arm (like with the succession of coils), which means to say that the additional turns are wound around the arms B18, B1, B2 and B3 in the case of FIG. 7. This offsetting by one arm makes it easier to manufacture the rotor 1 because the machine used to form the turns is already configured to perform a one-arm offsetting between the various coils. However, other positionings, different from the positioning of the last coil C9, C9', for the additional turn or turns are equally possible.

Likewise, the second series of coils (of the rotor 1 of FIG. 7) may equally comprise at least one additional turn. It is equally possible to have a single additional turn partially overlapping the respective turns of the two last coils of the two series so that one single series of coils comprises one or several additional turns providing retention for the turns of the last coils of the two series.

FIG. 8 depicts the various steps in the manufacture of the rotor 1.

The first step 101 is to manufacture this body 3. As indicated previously, this body 3 can be made from a stack of laminations joined together. The first step for example involves a first sub-step of cutting the laminations to the desired shape, notably according to the number of arms of the body 3, and a second sub-step of fixing the laminations together, for example by clipping, soldering or bonding.

The method next comprises a succession of steps 102 to 109, each step corresponding to a winding of a predetermined number N, for example 30, of turns around a plurality of arms to form a coil C1 . . . C8. Two successive coil-winding steps winding the coils of one series are performed around at least one common arm and at least one distinct arm so that two adjacent coils of one series are angularly offset from one another with a partial overlap. Thus, step 102 for example corresponds to the creation of the coil C1 around the arms B9, B10, B11 and B12 (as indicated in FIG. 3) and step 103 for example corresponds to the creation of the coil C2 around the arms B8, B9, B10 and B11. The turns of the coil C2 therefore overlap the turns of the coil C1 on the arms B9, B10, and B11.

In addition, in the event that the rotor 1 comprises several series of coils, notably two series of coils as in the case of the rotor 1 of FIG. 3, the method comprises a second succession of steps 102' to 109' which are performed respectively simultaneously with the steps 102 to 109. Step 102' therefore corresponds to the creation of the coil C1' around the arms B18, B1, B2 and B3 (as indicated in FIG. 3) and step 103' therefore corresponds to the creation of the coil C2' around the arms B1, B2, B3 and B4. The turns of the coil C2' therefore overlap the turns of the coil C1' on the arms B1, B2, and B3.

The method also comprises a step 110 of winding a second predetermined number N' of turns of the coilset. This second number N' is lower than the first predetermined number N (30) and is, for example, equal to 27. This step 110 makes it possible to form a last coil C9 around a plurality of arms of the body. Like with the steps 102 to 109, this additional step is performed around at least one arm common to the penultimate coil C8 and at least one arm distinct from the penultimate coil C8, so that the last coil is angularly offset from the penultimate coil with a partial overlap. In the case of FIGS. 3 and 5, the last coil C9 is produced by a winding of 27 turns around the arms B17, B18, B1 and B2.

Likewise, a parallel and simultaneous step 110' may be performed to form a last coil C9'. However, it should be noted that, in order to perform several winding steps simultaneously, the machine used for the manufacture of the coilset needs to comprise several winding arms, each arm being capable of performing windings to form a coil C1 . . . C9'.

Alternatively, steps 102' to 110' may be offset temporally with respect to steps 102 to 110.

Steps 102' to 110' may also be temporally intercalated with steps 102 to 110, notably in instances in which the first series of coils C1 . . . C9 and the second series of coils C1' . . . C9' are produced by a machine comprising just one winding arm. In that case, the starting point is step 102, followed by step 102', followed by step 103, followed by step 103', and so on.

The method also comprises an optional step 111 of winding at least one additional turn as described hereinabove. The number of additional turns is, for example, three turns which are, for example, wound in a direction substantially perpendicular to the turns of the last coil formed in step 110. The last turn or turns are for example coiled in the opposite direction to the last coil.

Similarly, an optional step 111' may also be carried out in order to form three additional turns associated with the second series of coils. Steps 111 and 111' may be simultaneous.

The additional turns are for example arranged in such a way as to partially overlap the turns of the last coils C9 and C9' of the two series. The various additional turns may be wound on different arms from one another. Moreover, the additional turns may be arranged in such a way as to partially overlap the turns of the last coils of two series, notably in the case of a rotor 1 comprising four series of coils.

The invention claimed is:

1. A rotor of a rotary electric machine, comprising:
a body comprising a cylindrical central core and a circumferential plurality of arms extending radially out from the cylindrical central core, the body being mounted with the ability to move about an axis of rotation X;
a coilset produced by windings of turns and forming at least one series of coils;

a coil comprising a predetermined number of turns around at least two arms of the body, two adjacent coils of a series being angularly offset from one another with a partial overlap, wherein the last coil of a series, situated radially furthest towards the outside, comprises a predetermined number of turns that is lower than the predetermined number of turns of the other coils of the series, wherein the at least one series of coils comprises at least one additional turn wound between several arms of which at least one is different from the arms around which the last coil of the series is wound, and wherein the at least one additional turn extends in a direction that is determined by 360° divided by a number of poles of the rotary electric machine with respect to the direction of the turns of the last coil of the series.

2. The rotor according to claim 1, in which the at least one additional turn is wound around at least one of the arms around which the last coil of the series is wound.

3. The rotor according to claim 1, in which the at least one additional turn partially overlaps the turns of the last coil of the series.

4. The rotor according to claim 1, comprising two series of coils arranged at 180° with respect to one another with respect to the axis of rotation X.

5. The rotor according to claim 1, in which the arms of the body have the overall shape of a T of which the base is directed towards the axis of rotation X and of which the free end forms two salient turn-retention returns, the predetermined number of turns of the last coil of the at least one series being determined such that the turns of the said last coil are at least partially comprised in a space defined by straight lines passing through the end of the salient returns allowing retention of the turns of the said last coil and perpendicular to a straight line connecting the ends of the said salient returns allowing retention of the turns of the said last coil.

6. The rotor according to claim 1, configured to collaborate with a stator of the rotary electric machine comprising a number of poles greater than or equal to four.

* * * * *